March 20, 1928.

C. A. SPOTZ 1,663,147

HYDRAULIC BRAKE

Filed April 16, 1926

Inventor
Chester A. Spotz

By Spear, Middleton, Donaldson & Hall
Attorney

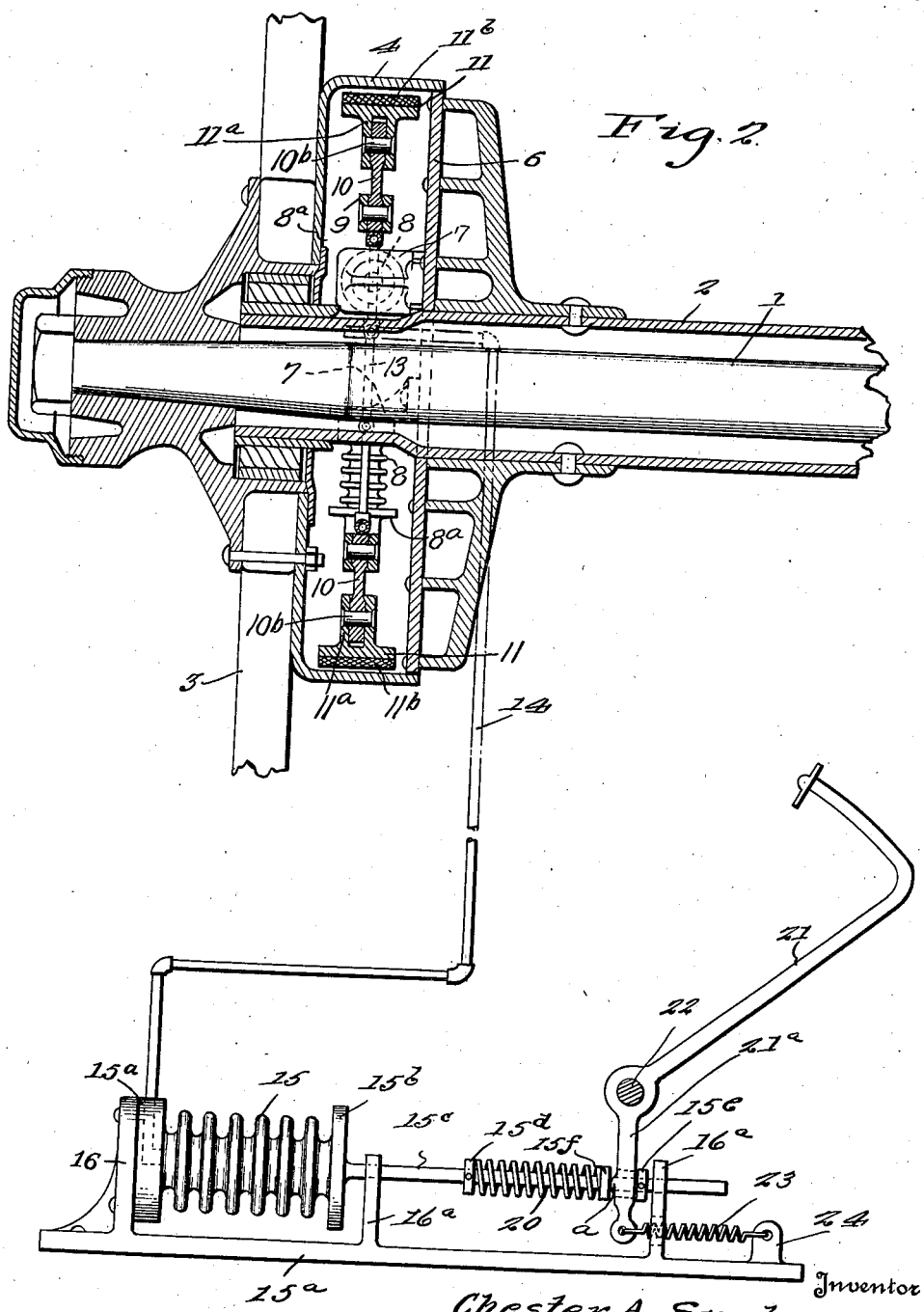

Patented Mar. 20, 1928.

1,663,147

UNITED STATES PATENT OFFICE.

CHESTER A. SPOTZ, OF GREENWICH, CONNECTICUT.

HYDRAULIC BRAKE.

Application filed April 16, 1926. Serial No. 102,563.

My present invention relates to improvements in so-called hydraulic brakes of the type commonly employed on motor vehicles provided with four wheel brakes.

The invention has, among its objects, to provide a brake of this character which will be proof against leakage and yet be free from the necessity of providing packing such as is necessary where moving pistons are employed; to secure adequate brake shoe clearance without detracting from efficient braking action; to provide a construction which will be free from all danger of detrimental action of dust and mud; and one in which there will be no danger of damage of parts from excessive pressure on the foot lever.

With these and other objects in view, the invention includes the novel features of construction and arrangement and combination of parts hereinafter described, my said invention being defined and ascertained by the claim appended hereto.

An embodiment of the invention is illustrated in the accompanying drawings, in which:—

Figure 2 is a section on line 2—2 of Fig. 1, but showing in addition and diagrammatically, the master bellows, its operating lever and pipe connection, the external emergency brake band being omitted from Fig. 1, for convenience of illustration.

Figure 1:
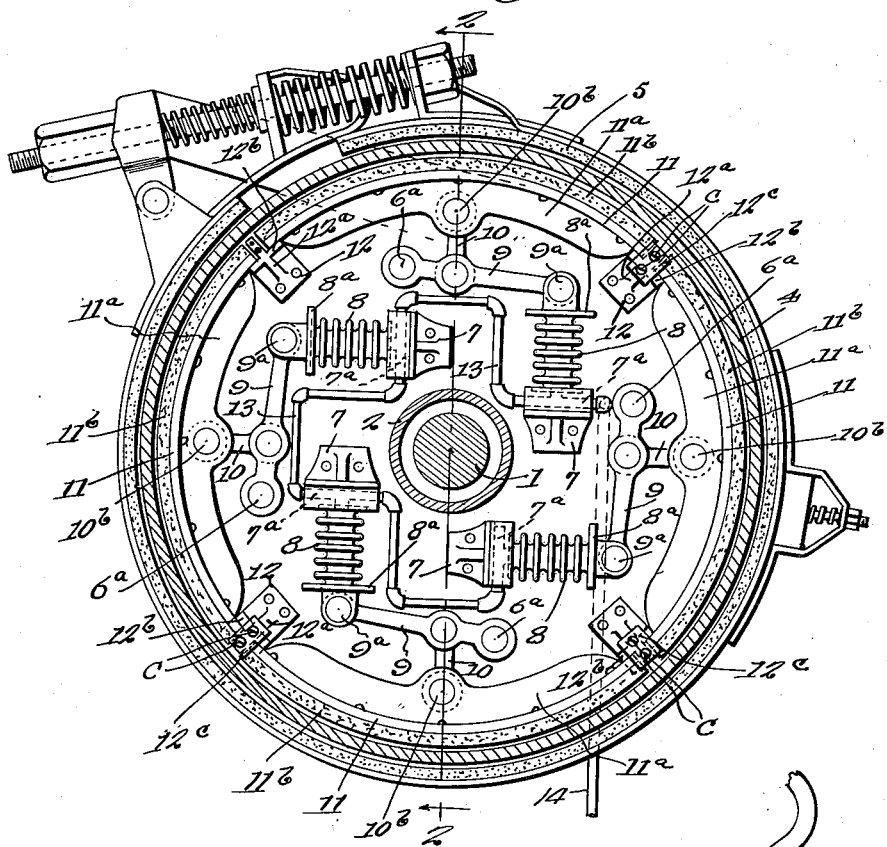
Figure 1 is a side elevation, partly in section, showing a brake drum with associated brake shoes and cooperating parts.

In these drawings I have shown the brake in connection with the drum of one wheel only and that one of the rear wheels, this being for simplicity of illustration, as its extension to the other wheels would be obvious to one skilled in the art. The axle shown at 1, axle housing 2, wheel 3 and brake drum 4, are intended to be representative of the customary or any desired form, and hence need no specific description, and the brake drum may be provided with the customary external band brake 5 which may be used for emergency purposes.

The axle housing carries a rigid disc 6, to which are secured bracket members 7, lying within the space defined by the drum, and each of which in turn carries an expansible metal bellows 8 of the type known as a "sylphon." To the head member 8ª of each bellows is pivotally connected, at 9ª the movable end of a lever 9 fulcrumed on a pin 6ª carried by the plate 6.

A link 10 has one end pivotally connected to the lever 9 at a point intermediate its ends and its other end pivotally connected to the central portion of the web 11ª of brake shoe 11. Four of these brake shoes, and operating levers, and bellows are provided, symmetrically disposed about the wheel axis, and the shoes are held properly spaced and guided by brackets 12 secured to the disc 6 and having radial webs or flanges 12ª lying between the adjacent ends of the brake shoes. Brackets 12 are provided with lugs 12ᵇ against which the inner faces of the ends of the shoes abut when drawn inward, to limit such inward movement and hold them truly concentric to the drums and spaced therefrom at all points whereby rubbing is prevented.

In order that the brake shoes may be readily relined when worn, brackets 12 are provided with plate members 12ᶜ removably secured thereto by screws c, which plates overlie the ends of the brake shoes and hold them normally in position. By removing the plates 12ᶜ and the pins 10ᵇ the shoes may be readily slipped out and the worn brake lining or facing replaced.

The brake shoes may be of metal provided with any suitable brake surface material 11ᵇ, and as no bending is necessary, as in the case of brake bands, they may be formed on a curve corresponding exactly to the curvature of the inner periphery of the drum, and be braced against distortion by the webs 11ª.

The bracket members 7 are provided with ports or passages 7ª which communicate with the interior of the bellows and are connected to each other by the pipes 13, the port 7ª of one of the brackets being connected by a pipe 14 with the stationary element or base 15ª of a master bellows 15 carried by a suitable bracket 16, which in practice would be placed under the floor of the auto adjacent the driver's seat. The movable element 15ᵇ is provided with a rod 15ᶜ guided by posts or standards 16ª.

Rod 15ᶜ has fast thereon spaced apart collars 15ᵈ and 15ᵉ and a slidable collar 15ᶠ between which and the collar 15ᵈ and encircling the rod is a compression spring 20. A foot lever 21 fulcrumed on a fixed pivot 22 has a depending arm 21ª provided with a slot or opening to receive the rod 15ᵉ, the portion of the arm adjacent the opening lying between the collars 15ᵉ and 15ᶠ and being preferably provided with a rounded boss *a* for contact with the slidable collar 15ᶠ.

The lower end of the arm 21ᵃ is connected by a tension spring 23 with a fixed abutment 24 which, when pressure on the brake pedal is removed, tends to return said lever to initial position and also, by arm 21ᵃ acting on collar 15ᵉ to extend the bellows 15.

Pressure on the brake pedal compresses spring 20 and transmits movement to the rod 15ᶜ but the strength of spring 20 is to be made such that overloading of the master bellows 15 will be impossible, and hence all danger of its rupture avoided.

It will thus be seen that when pressure is applied to the foot lever the master bellows will be collapsed, which will cause the contained fluid (which fills the entire system and is usually oil or other non-congealable liquid) to be forced into the bellows 8 whereby all the latter are simultaneously expanded and the shoes forced outward into contact with the brake drum. On release of the brake pedal, spring 23 extends the master bellows which withdraws liquid from all the bellows 8 and produces suction therein which in turn draws all the brake shoes inward until they are sustained by lugs 12ᵇ. Being positively held against these, no rubbing or dragging of the brake surfaces is possible and rattling is prevented.

It will be observed that the brake shoes and their operating bellows and connections are wholly enclosed and hence protected from dust, mud, etc.

Figure 3:
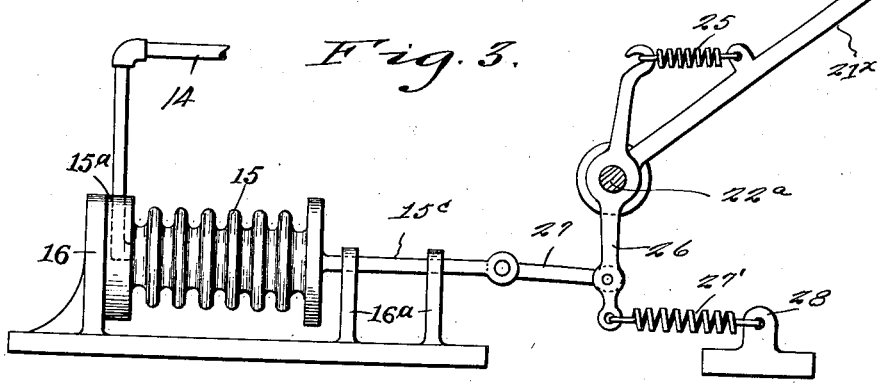
Figure 3 is a view of a modification.

Instead of using the form of operating device shown in Figs. 1 and 2, I may use the form shown in Fig. 3.

In this the brake pedal lever 21ˣ is articulated on a fixed pivot 22ᵃ and is connected by a spring 25 with the upper arm of a two armed lever 26 fulcrumed on said pivot 22ᵃ independently of the pedal lever. The lower arm of said two armed lever 26 is connected by a link 27 with the rod 15ᶜ of the master bellows.

Said lower arm of lever 26 is also connected by a spring 27' with a fixed abutment 28 which tends to extend the master bellows when pressure on the brake pedal is removed.

Spring 25 is made of greater strength than spring 27' so that its tension, when pedal lever 21ˣ is operated, will collapse the master bellows against the tension of spring 27', but the strength of spring 25 is such that rupture of the bellows will not be possible.

Having thus described my invention, what I claim is:—

In a brake mechanism for motor vehicles, a brake drum and axle housing, a disc member carried by the housing and closing the open side of the drum, a plurality of arc-shaped radially movable brake shoes within the drum, brackets mounted on said disc between said shoes, said brackets being adapted to guide said shoes and to limit their inward movement, plates removably mounted one on each bracket to normally hold the shoes against axial movement in the drum, a plurality of expansible metal bellows carried by said disc, one for each shoe, a plurality of levers each mounted at one of its ends on a fixed pivot on said disc, and each connected at its other end to one of said bellows, a plurality of links each swivelly connected at one end to an intermediate portion of a lever and swivelly connected at the other end to a shoe, said bellows being connected in series so as to be simultaneously operable by fluid pressure.

In testimony whereof I affix my signature.

CHESTER A. SPOTZ.